US012591659B2

(12) United States Patent
    Duplys

(10) Patent No.: US 12,591,659 B2
(45) Date of Patent: Mar. 31, 2026

(54) METHOD FOR IDENTIFYING POTENTIAL DATA EXFILTRATION ATTACKS IN AT LEAST ONE SOFTWARE PACKAGE

(71) Applicant: Robert Bosch GmbH, Stuttgart (DE)

(72) Inventor: Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 167 days.

(21) Appl. No.: 18/469,672

(22) Filed: Sep. 19, 2023

(65) Prior Publication Data

US 2024/0104191 A1    Mar. 28, 2024

(30) Foreign Application Priority Data

Sep. 28, 2022    (DE) ...................... 10 2022 210 264.9

(51) Int. Cl.
    *G06F 21/51*        (2013.01)
    *G06F 8/71*         (2018.01)
    *G06F 21/57*        (2013.01)
(52) U.S. Cl.
    CPC ................ *G06F 21/51* (2013.01); *G06F 8/71*
        (2013.01); *G06F 21/577* (2013.01); *G06F*
                            *2221/033* (2013.01)

(58) Field of Classification Search
    None
    See application file for complete search history.

(56) References Cited

U.S. PATENT DOCUMENTS

| | | | | |
|---|---|---|---|---|
| 11,526,624 | B2 * | 12/2022 | Brannon ............. | H04L 63/0227 |
| 2019/0130100 | A1 * | 5/2019 | Dymshits .......... | G06F 16/90335 |
| 2019/0138717 | A1 * | 5/2019 | Ben-Shalom ......... | G06F 21/552 |
| 2022/0309163 | A1 * | 9/2022 | Purushothaman ...... | G06F 21/31 |
| 2022/0311794 | A1 * | 9/2022 | Maya ................... | G06F 11/0766 |
| 2023/0185915 | A1 * | 6/2023 | Rao ........................ | G06F 21/564 |
| | | | | 726/22 |
| 2023/0252152 | A1 * | 8/2023 | Yerra ...................... | G06F 21/57 |
| | | | | 726/26 |
| 2023/0315840 | A1 * | 10/2023 | Cambric ................ | G06F 21/34 |
| | | | | 726/23 |

* cited by examiner

*Primary Examiner* — Boris D Grijalva Lobos
(74) *Attorney, Agent, or Firm* — NORTON ROSE FULBRIGHT US LLP

(57)                    ABSTRACT

A method for identifying potential data exfiltration attacks in at least one software package. The method includes: tracking at least one change to the software package; and detecting a manipulation suitable for data exfiltration on the changed software package.

14 Claims, 2 Drawing Sheets

Figures 2, 3:
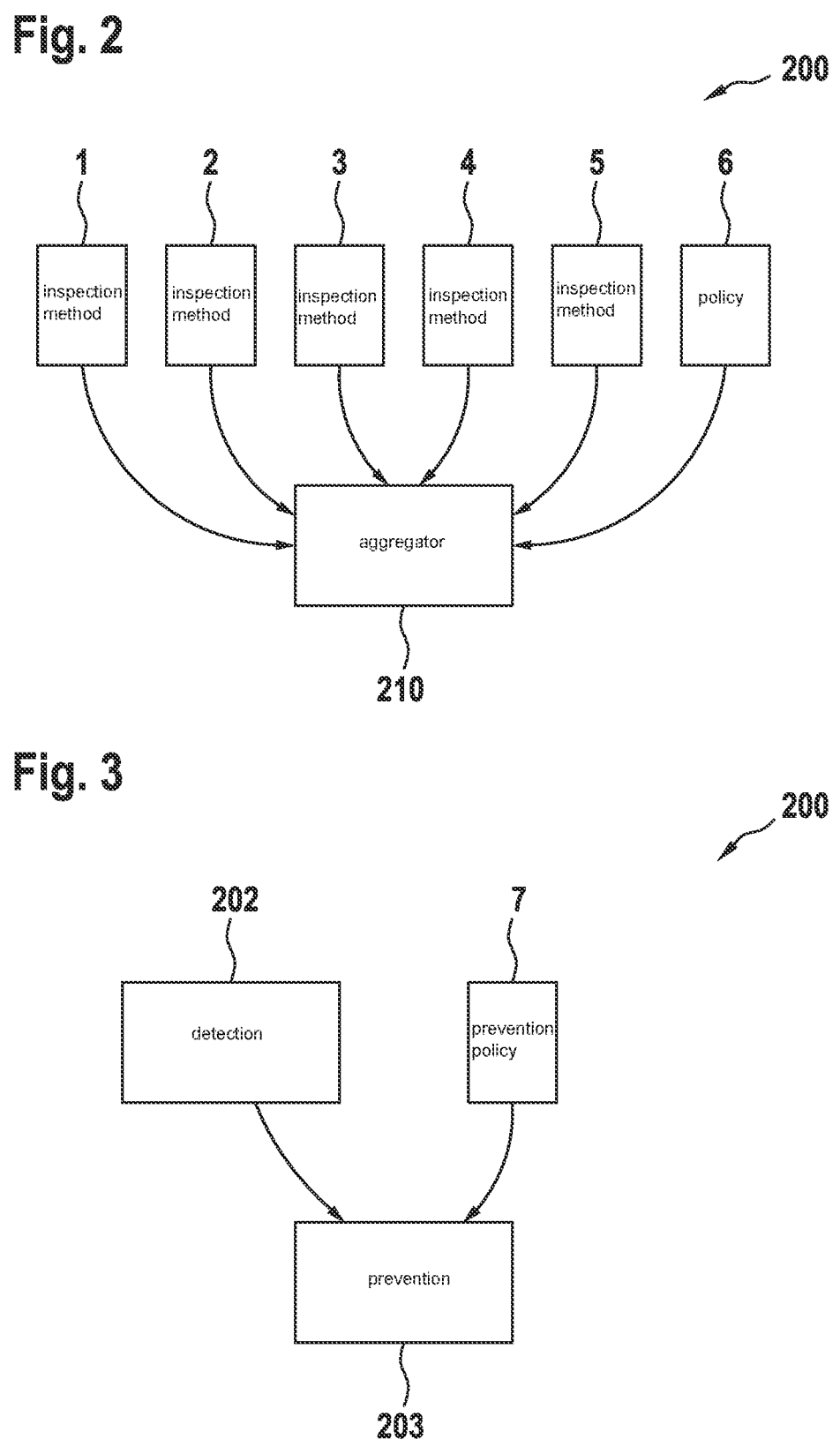

| inspection method | inspection method | inspection method | inspection method | inspection method | policy | aggregator

202                7 detection        prevention policy prevention

203

METHOD FOR IDENTIFYING POTENTIAL DATA EXFILTRATION ATTACKS IN AT LEAST ONE SOFTWARE PACKAGE

CROSS REFERENCE

The present application claims the benefit under 35 U.S.C. § 119 of German Patent Application No. DE 10 2022 210 264.9 filed on Sep. 28, 2022, which is expressly incorporated herein by reference in its entirety.

FIELD

The present invention relates to the testing of software packages in order to protect against data exfiltration attacks. The present invention also relates to a computer program and to a device for data processing.

BACKGROUND INFORMATION

Data exfiltration attacks are a serious risk when using publicly available software packages. It regularly becomes apparent that attacks on the software supply chain (software supply chain attacks) have been made in which conventional software packages, e.g. Python, PHP, Ruby or Rust packages, have been manipulated in order to extract sensitive information from the system of the developer or user.

Manipulation of software packages can result in data exfiltration. This means that sensitive data such as developer environment variables, which can comprise login data and keys, are transmitted to an external server. In the case of the data exfiltration attacks identified to date, all the environment variables have been collected and sent to an external server, often during the initialization of the manipulated software packages.

Checking the security of an application by auditing, validation, and pentesting is thus often no longer sufficient to identify and prevent data exfiltration attacks. This is aggravated by the fact that any external dependence in the form of a software package used by the application can carry the risk of data exfiltration. In general, but especially in safety-critical applications, for example in software for devices (firmware) such as domestic appliances or robots, particular precautions are desired to avoid such attacks.

SUMMARY

The present invention provides a method, a computer program, and a device for identifying potential data exfiltration attaches in at least one software package. Further features and details of the present invention will become apparent from the disclosure herein. Here, features and details which are described in connection with the method according to the present invention also apply, of course, in connection with the computer program according to the present invention and the device according to the present invention, and vice versa in each case, so that, with regard to the disclosure, individual aspects of the present invention always refer or can refer to one another.

The method serves to identify potential attacks in the field of information technology, specifically to identify potential data exfiltration attacks in at least one software package. In this context, "potential" means that the data exfiltration attacks may not yet have taken place and can be prevented by the method according to the present invention. Of course, it also means that an attack that has possibly already taken place is identified and then countermeasures can be taken on the basis of the identification. It can also mean that only a probability and/or risk of a data exfiltration attack is identified.

In a method according to an example embodiment of the present invention, the following steps can be carried out, preferably in an automated manner and/or by a computer and/or successively and/or repeatedly and/or continuously:

tracking at least one change to the software package, preferably a change to a code of the software package and/or an update of the software package, for example using a version history of the software package and/or triggered by the publication of an update of the software package, and detecting a manipulation suitable for data exfiltration on the changed software package, preferably in order to identify the potential data exfiltration attack using the detected manipulation.

This has the advantage that potential data exfiltration attacks can be identified and possibly even prevented in good time. The method according to the present invention offers the possibility of using a combination of continuous tracking, detection and possibly prevention of such attacks during the entire lifecycle of a software package. Furthermore, it is possible for finely graduated control to be carried out using policies for identification and prevention strategies.

The method according to the present invention may be used, for example, as a preceding step before distribution of the software package to at least one device ("rollout"). The device on which the changed software package is used is, for example, a domestic appliance or a robot or a vehicle or a control device for a machine or the like. The changed software package is preferably updated software and thus represents a new software version. However, it is assumed that the change may potentially also comprise a malicious manipulation in addition to the update.

According to a further step, in response to the detection of the manipulation, prevention (i.e., prevention of the data exfiltration attack) can also be carried out, which comprises at least one suitable preventative measure in order to prevent the data exfiltration attack. This can comprise, for example, prevention of the rollout, that is to say the distribution of the software package to the at least one device.

An underlying consideration of the present invention is that, in the case of data exfiltration attacks, a version history of the affected software package often shows anomalies. For example, it may be the case that a software package has no longer been updated for several years and suddenly appears with a new version. Such anomalies can be detected by monitoring version management as part of the tracking.

The method according to the present invention serves, in particular, for the automated identification and/or prevention of potential data exfiltration attacks in external software packages, e.g., in software packages that are provided with package management systems such as pip, npm, gem or the like.

A further advantage can be achieved within the scope of the present invention if the performance of the tracking comprises at least the following step in order to identify the at least one change in the software package in the form of a source code change:

identifying the at least one change using version management for the software package, preferably using a version history of the version management, wherein for this purpose the version management is accessed via a network, in particular the Internet.

For example, GitHub is a network-based service for software development project version management. Via such services, changes in the code of the software package after updates are transparently traceable.

Furthermore, it can be provided within the scope of an example embodiment of the present invention for the detection to comprise at least two of the following inspection methods:

a signature-based inspection, in which the changed software package is searched for at least one code pattern (also called a signature), wherein the at least one code pattern can be specific to data exfiltration, a dynamic inspection, in which different versions of the software package are executed and the executions are compared with one another, a manifest-based inspection, in which the changed software package is examined using a predefined manifest, wherein the manifest can comprise a list of permitted functions and/or permitted outgoing connections of the software package, an outlier detection, in which a trained model such as at least one artificial neural network is used for detecting the manipulation, a model-based inspection, in which the software package is executed and the execution can be examined using a predefined model, wherein preferably a detection result of the detection indicates the manipulation, preferably by a statement of the probability of the presence of the manipulation and/or of the suitability for data exfiltration.

The method according to the present invention is advantageously flexible, expandable, and tool- and method-agnostic, i.e. other identification methods can be used or added to the inspection methods described above without problems.

The particular execution of the software package can be carried out, for example, by at least one data processing device and/or an operating system provided thereon and/or an interpreter, for example on a web server and/or in a sandbox. A sandbox can refer to an isolated region in an operating system and/or a software environment and/or an IT environment and/or in the data processing device, within which each measure has no effect on the external environment. This can be, for example, a separate operating system and/or a virtual system. Software with the software package is shielded from the rest of the system, virtually placed in the sandbox, in which it cannot cause any damage and the effects of the software can be recorded.

In addition, it is possible within the scope of an example embodiment of the present invention for at least one signature-based inspection to be carried out during the detection, which signature-based inspection can comprise at least the following steps:

providing at least one code pattern, in particular a signature, which is specific to data exfiltration and for this purpose has been predefined manually, for example, and preferably characterizes functions and/or further software packages that are suitable for initiating an outgoing network connection, searching a source text of the changed software package for the at least one code pattern, determining a detection result on the basis of a result of the search.

This may have the advantage that a problematic manipulation of the software package can be identified with high reliability by means of such signatures, which are known for malicious behavior.

Furthermore, according to an example embodiment of the present invention, it can be provided for at least one dynamic inspection to be carried out during the detection, which dynamic inspection comprises at least the following steps:

selecting at least two different, in particular successive or random, versions of the changed software package, preferably on the basis of the version management system, executing the different versions, preferably in a sandbox environment, capturing a behavior of the executions of the versions, wherein the behavior preferably comprises the generation of outgoing network connections, comparing the captured behavior of the different versions with one another, determining a detection result on the basis of the comparison.

The execution can comprise, for example, an execution of software for which the software package is used together with further software packages. It is possible that unexpected network connections and/or network connections that are not typical for the software package are established in the process. This behavior can then be identified as malicious behavior, which indicates a manipulation suitable for data exfiltration.

A further advantage within the scope of an example embodiment of the present invention can be achieved if at least one manifest-based inspection is carried out during the detection, which manifest-based inspection comprises at least the following steps:

providing a predefined manifest that comprises a list of permitted functions and/or permitted outgoing connections of the changed software package, preferably in the form of a text-based file and/or structured file such as XML (Extensible Markup Language), yaml or JSON (JavaScript Object Notation), wherein the manifest can be machine-readable, checking the changed software package on the basis of the provided manifest, wherein the check comprises a static analysis, in particular a comparison of the source text with the manifest, and/or a dynamic analysis, preferably a comparison of a captured behavior of an execution of the changed software package with the manifest, determining a detection result on the basis of the check.

In order to capture the behavior, the software package can be executed in a sandbox, for example, and the behavior can be recorded. The manifest can, for example, have been manually predefined beforehand and thus correspond to a predetermined specification of the behavior of the software package.

According to an example embodiment of the present invention, it is also possible for at least one outlier detection to be carried out during the detection, which outlier detection comprises at least the following steps:

training a model, in particular a classifier and/or at least one artificial neural network, on the basis of different versions of the software package, using the trained model with the changed software package as input for the trained model, determining a detection result on the basis of an output of the trained model.

In this case, different versions of the software package can thus be used as training data for the training in order to enable a detection of the manipulation based on machine learning.

According to an advantageous development of the present invention, it can be provided for at least one model-based inspection to be carried out during the detection, which model-based inspection comprises at least the following steps:

> providing a model for the software package,
>
> executing the changed software package, preferably in a sandbox environment,
>
> capturing a behavior of the executed software package, wherein the behavior preferably comprises the generation of outgoing network connections,
>
> comparing the captured behavior with the provided model,
>
> determining a detection result on the basis of the comparison.

The model can, for example, model a behavior of the software package, in particular with regard to the outgoing network connections, but possibly also with regard to other criteria such as processor and storage utilization or reaction time. The model can be an executable model, for example an executable version of the software package, optionally also implemented in a different programming language or on a different abstraction layer, for example as a pure behavior model. Also, the model can comprise a collection of unit tests that include the expected output for each input. Alternatively or additionally, the model can also contain descriptions of the expected side effects during execution of the software package. For example, the model can contain a textual description (or any structured notation) of which outgoing connections are produced or which execution time or which power consumption (e.g., as a comparison/relation between individual methods of the software package examined) is to be expected for the functions of the software package. A reliable detection can thus be carried out by defining the desired behavior on the basis of a model.

It is also possible for a prevention to be initiated after the performance of the detection, in which prevention at least one of the following steps is carried out:

> recalling an update of the software package for a target system on which the software package is used or is intended for use,
>
> deactivating the target system,
>
> restricting operation of the target system.

The target system is, for example, the device already described above on which the software package is distributed.

The present invention also relates to a computer program, in particular a computer program product, comprising commands which, when the computer program is executed by a computer, cause the computer to carry out the method according to the present invention. The computer program according to the present invention thus brings with it the same advantages as have been described in detail with reference to a method according to the present invention.

For example, a data processing device which executes the computer program can be provided as the computer. The computer can have at least one processor for executing the computer program. A non-volatile data memory can also be provided, in which the computer program is stored and from which the computer program can be read by the processor for execution.

The present invention can also relate to a computer-readable storage medium which comprises the computer program according to the present invention. The storage medium is designed, for example, as a data store such as a hard drive and/or a non-volatile memory and/or a memory card. The storage medium can be integrated into the computer, for example.

The present invention also relates to a device for data processing, preferably a computer, which is designed to carry out the method according to the present invention.

Furthermore, the method according to the present invention can also be carried out as a computer-implemented method.

Further advantages, features and details of the present invention will become apparent from the following description, in which exemplary embodiments of the present invention are described in detail with reference to the figures. The features mentioned in the description can be essential to the present invention in each case individually or in any combination.

BRIEF DESCRIPTION OF THE DRAWINGS

FIG. 2 shows further details of a method according to exemplary embodiments of the present invention.

FIG. 3 shows further details of a method according to exemplary embodiments of the present invention.

DETAILED DESCRIPTION OF EXAMPLE EMBODIMENTS

Figure 1:
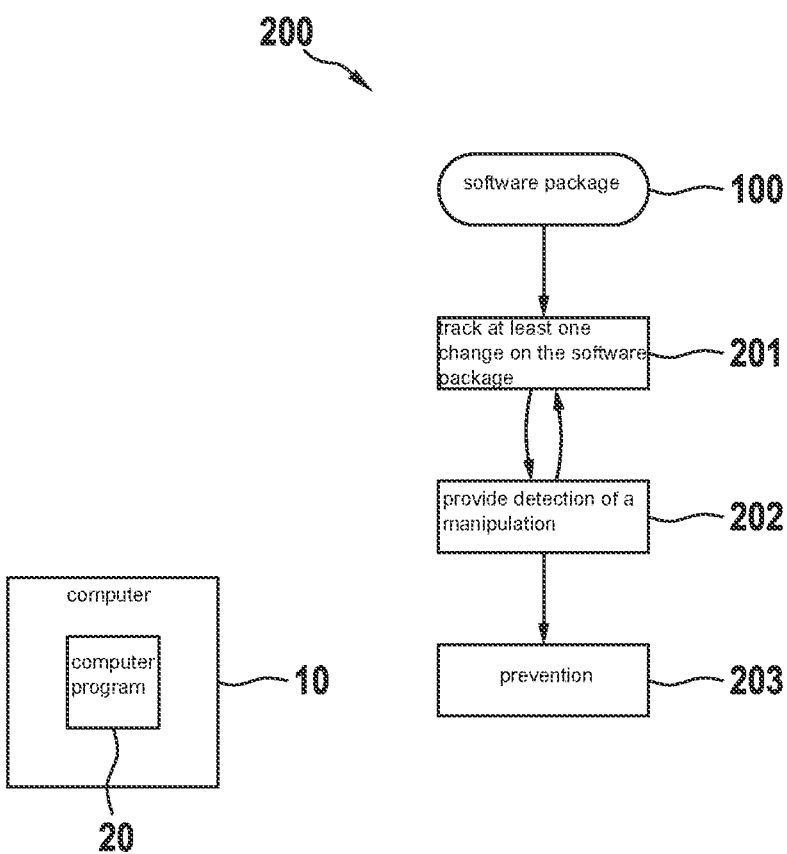
FIG. 1 shows an exemplary embodiment of a method and of a computer program and of a device, according to the present invention.

In the following figures, identical reference signs are also used for the same technical features of different embodiments.

FIG. 1 shows a method 200 according to one possible variant, wherein the method 200 can be used to identify potential data exfiltration attacks in at least one software package 100. In this case, the method according to a first method step 201 can comprise tracking at least one change on the software package 100. According to a second method step 202, detection of a manipulation suitable for data exfiltration on the changed software package 100 can be provided.

Furthermore, a computer program 20 can be provided which comprises commands that, when the computer program 20 is executed by a computer 10, cause the computer to carry out the method 200 according to the present invention. The computer is, for example, a device 10 for data processing which is accordingly designed to carry out the method 200 according to the present invention.

According to the method 200 according to the present invention, it can be provided for the development of a software package 100, i.e. in particular the code changes from version to version or from commit to commit, to be tracked during the entire lifecycle of the software package 100. Furthermore, a multi-inspection approach can be used to identify code that is (potentially) used for data exfiltration. In the context of the present invention, a multi-inspection approach is understood to mean that multiple inspection methods are used in combination. In addition, automatic or semi-automatic preventive measures can be initiated on the basis of a "policy" 6 defined for certain target systems or target packages.

FIG. 1 shows an exemplary sequence of the method 200. The superordinate steps of tracking 201, detection 202 and prevention 203 are shown. The arrow from detection 202 to tracking 201 indicates that the method 200 can be a continuous process, which can be made available, for example, in a development environment and/or as a service. For example, the method 200 can be initiated automatically, e.g. by an automatic time-based execution such as by means of a cron daemon.

A task of the detection 202 to identify such source code changes that are outliers compared with the previous, regular source code changes can be considered to be superordinate. The reason for this is that malicious code that can be used for data exfiltration is different from the benign code in the particular software package 100. In order to identify such outliers reliably and automatically, the tracking 201 can precede the detection 202, in which a version control system, also referred to as version management, for example a Git repository, is automatically accessed. In a version control system, the source code of the target software package is usually hosted, and the option is provided of obtaining information about the newly added versions of the software package 100 and/or commits. Modern version control systems provide such functions, and access to code repositories is regularly available for open-source software packages 100.

The detection 202 can serve to identify (potentially) malicious code, i.e., code that is (or could be) used for data exfiltration. The detection 202 advantageously takes place with the aid of a multi-inspection approach, which is shown schematically in FIG. 2. Multiple detector modules can each provide specialized inspection methods and are applied to the software package 100 to be tested. The results of the detector modules can subsequently be used as input for an aggregator module 210 (referred to as aggregator for short). Furthermore, the aggregator module 210 uses the policy 6 as a further input. This policy 6 is used to control the behavior of the aggregator 210.

The detection 202 uses, for example, a plurality of the detector modules that can use statistical methods and/or machine learning algorithms. In many cases, these methods 200 do not provide a clear result (for example, when the value of a statistical qualifier with the range [0,1] is between 0.3 and 0.7). To handle such cases, the policy 6 can include an instruction that the identification of a (potentially) malicious code is reported only when at least two of the inspection methods have detected a malicious code.

The detection 202 can use a combination of two or more of the inspection methods or detector modules (either by implementing only these inspection methods or by activation thereof in the policy 6). FIG. 2 shows, by way of example, five inspection methods 1, 2, 3, 4 and 5.

The signature-based inspection 1 can be designed to search for specific code patterns that are known for the data extraction. For example, for Python, these can be the use of socket, requests, urllib or other software packages that enable an outgoing network connection to be established. For this purpose, code patterns that have already been identified in malicious software packages can also be included. This inspection method uses the knowledge that most software packages 100 (for example, ctx for the manipulation of dictionaries) do not require outgoing connections.

The dynamic inspection 2 can first use two successive versions (i.e., possibly also commits) $v\_1, v\_2$ of the software package 100 to be examined, install both versions in a sandbox environment (for example, a Docker container), execute them, and compare their behavior with respect to the outgoing connections that these versions attempt to create. If $v\_2$ (a higher version or later commit) attempts to create (more) outgoing connections than $v\_1$, this indicates a data exfiltration attempt. This can thus be detected as a manipulation suitable for data exfiltration.

Alternatively or additionally, the dynamic inspection 2 can be applied to two random versions or commits (in order to increase the identification rate). As a further possibility, the execution of $v\_1, v\_2$ during the dynamic inspection 2 can be monitored for other suspicious events as outgoing network connections (for example, the creation of a publicly accessible file or the opening/exposure of a port on the target system) or for metrics indicative of a side-channel leak (for example, data-dependent current consumption, data-dependent time delays, or the use of cryptographic routines or accelerators).

The manifest-based inspection 3 can use a manifest provided by the manufacturers of the software package 100 to be examined. The manifest includes, for example, a machine-readable yaml or json file for the software package 100. The manifest contains a list of the (possible) outgoing connections and, if such connections are used, information about the expected, i.e., benign, use. For example, the manifest can contain information about which functions of the software package 100 to be checked are expected to establish outgoing network connections, and which libraries or modules are used by these functions. After reading and processing the manifest, the manifest-based inspection 3 checks the software package 100 against this manifest, either with static (for example, grep, regular expressions, extraction of information from AST, etc.) or dynamic (for example, using a sandbox+call trace) analysis. The inventive concept behind this inspection method is that malicious code must be added for data exfiltration and would not be included in such a manifest. (This naturally assumes that the manifest itself is not compromised, but this is easy to check if a version control system is used, since all changes to the manifest would be immediately visible). Optionally, the manifest can contain a list of all functions that are to be expected in the software package 100 examined.

The outlier detection 4 can use individual commits or groups of commits (depending on how many changes were made in a single commit) to train a machine (or statistical) classifier how benign changes to the code of the software package 100 to be tested typically look. Subsequently, the trained classifier can be used for a particular commit (or version) of the software package 100 to determine whether it is an outlier, i.e. whether unusual code changes have been made in this commit or this version. The inventive concept behind this inspection method is that, especially in the case of mature software packages 100, benign code changes are generally aimed at adding functions consistent with the technical purpose of software package 100. Thus, benign code changes are generally the extension or the refactoring of existing functions or the addition of functions that are similar to those already implemented. A trained model such as a classifier can be particularly suitable for also detecting such manipulations.

Furthermore, the model-based inspection 5 can use as input a model of the software package 100 to be tested, initialize this software package 100 in a sandbox environment, and check whether the actual software package 100 behaves identically to the model. The model can either be an executable model, for example an executable version of the software package 100 (possibly implemented in a different programming language or on a different abstraction layer, for example as a pure behavior model) or a collection of, for example, docstrings or unit tests that contain the expected output for each input. Alternatively or additionally, the model can also contain descriptions of the expected side effects. For example, the model can contain a textual description (or any structured notation) of which outgoing connections are produced or which execution time or which power consumption (e.g. as a comparison/relation between individual methods of the software package 100 examined) is to be expected for the functions of the software package 100. Optionally, a static analysis of the software package 100 to be tested can be carried out (since it is assumed that the source code of the software package 100 is available) in order to check whether the model actually describes all the functions contained in the software package 100.

FIG. 3 shows that the prevention 203 can use the results of the detection 202 and the prevention policy 7 as input. If a (potentially) malicious code was discovered in the software package 100 examined, the prevention 203 initiates a reaction according to the predefined policy 7. The reaction can, for example, consist in recalling the update of the connected target system. Alternatively, depending on the actuator capabilities of the target system, the prevention policy 7 can be more fine-grained and only cause a rollback or, for example, a deactivation of the target system (or putting the target system into a restricted operating mode).

The above description of the embodiments describes the present invention exclusively in the context of examples. Of course, individual features of the embodiments, provided they make technical sense, can be freely combined with one another without departing from the scope of the present invention.

What is claimed is:

1. A method for identifying potential data exfiltration attacks in at least one software package, comprising the following steps:

tracking at least one change to the software package;

performing a first inspection method on the changed software package to generate a first probability indicating a likelihood of a manipulation suitable for data exfiltration;

performing a second inspection method, different from the first inspection method, on the changed software package to generate a second probability indicating a likelihood of the manipulation suitable for data exfiltration;

detecting the manipulation suitable for data exfiltration based on at least the first probability exceeding a first probability threshold and the second probability exceeding a second probability threshold; and outputting a manipulation result based on the detecting and according to a predefined policy indicating a threshold number of inspection methods required to output the manipulation result.

2. The method according to claim 1, wherein the tracking includes at least the following step in order to identify the at least one change in the software package in the form of a source code change:

identifying the at least one change using version management for the software package, using a version history of the version management, wherein for the identifying, the version management is accessed via a network including the Internet.

3. The method according to claim 1, wherein the first inspection method and the second inspection method are chosen from of the following inspection methods:

a signature-based inspection, in which the changed software package is searched for at least one code pattern, wherein the at least one code pattern is specific to data exfiltration, a dynamic inspection, in which different versions of the software package are executed and the executions are compared with one another, a manifest-based inspection, in which the changed software package is examined using a predefined manifest, wherein the manifest includes a list of permitted functions or permitted outgoing connections of the software package, an outlier detection, in which a trained model is used for detecting the manipulation, a model-based inspection, in which the software package is executed and the execution is examined using a predefined model;

wherein a detection result of the detecting indicates the manipulation, by a statement of a probability of the presence of the manipulation or of a suitability for data exfiltration.

4. The method according to claim 1, wherein at least one signature-based inspection is carried out as part of the first inspection method or the second inspection method, the signature-based inspection including at least the following steps:

providing at least one code pattern which is specific to data exfiltration and preferably characterizes functions or further software packages that are suitable for initiating an outgoing network connection, searching a source text of the changed software package for the at least one code pattern, determining a detection result based on a result of the searching.

5. The method according to claim 1, wherein at least one dynamic inspection is carried out as part of the first inspection method or the second inspection method, the dynamic inspection including at least the following steps:

selecting at least two different, successive or random, versions of the changed software package, executing the different versions in a sandbox environment, capturing a behavior of the executions of the different versions, wherein the behavior includes generation of outgoing network connections, comparing the captured behavior of the different versions with one another, determining a detection result based on the comparing.

6. The method according to claim 1, wherein at least one manifest-based inspection is carried out as part of the first inspection method or the second inspection method, the manifest-based inspection including at least the following steps:

providing a predefined manifest that includes a list of permitted functions or permitted outgoing connections of the changed software package, wherein the manifest is machine-readable, checking the changed software package based on the provided manifest, wherein the checking includes: a static analysis including a comparison of source text with the manifest, or a dynamic analysis including a comparison of a captured behavior of an execution of the changed software package with the manifest, determining a detection result based on the checking.

7. The method according to claim 1, wherein at least one model-based inspection is carried out as part of the first inspection method or the second inspection method, the model-based inspection including at least the following steps:

providing a model for the software package, executing the changed software package in a sandbox environment, capturing a behavior of the executed software package, wherein the behavior includes generation of outgoing network connections, comparing the captured behavior with the provided model, determining a detection result based on the comparison.

8. The method according to claim 1, wherein a prevention is initiated after outputting the manipulation result, the prevention including at least one of the following steps:

recalling an update of the software package for a target system on which the software package is used or is intended for use, deactivating the target system, and restricting operation of the target system.

9. The method according to claim 1, wherein at least one outlier detection is carried out as part of the first inspection method or the second inspection method, the outlier detection including at least the following steps:

training a model including a classifier and/or artificial neural network, based on different versions of the software package, using the trained model with the changed software package as input for the trained model, determining a detection result based on an output of the trained model.

10. The method according to claim 1, wherein the manipulation result is output only when a number of inspection methods performed is greater than or equal to the threshold number of inspection methods required to output the manipulation result.

11. A non-transitory computer-readable medium on which is stored a computer program including commands for identifying potential data exfiltration attacks in at least one software package, the commands, when executed by a computer, causing the computer to perform the following steps:

tracking at least one change to the software package;

performing a first inspection method on the changed software package to generate a first probability indicating a likelihood of a manipulation suitable for data exfiltration;

performing a second inspection method, different from the first inspection method, on the changed software package to generate a second probability indicating a likelihood of the manipulation suitable for data exfiltration;

detecting the manipulation suitable for data exfiltration based on at least the first probability exceeding a first probability threshold and the second probability exceeding a second probability threshold; and outputting a manipulation result based on the detecting and according to a predefined policy indicating a threshold number of inspection methods required to output the manipulation result.

12. The non-transitory computer-readable medium according to claim 11, wherein the manipulation result is output only when a number of inspection methods performed is greater than or equal to the threshold number of inspection methods required to output the manipulation result.

13. A device configured for data processing for identifying potential data exfiltration attacks in at least one software package, the device comprising a processor configured to:

track at least one change to the software package;

perform a first inspection method on the changed software package to generate a first probability indicating a likelihood of a manipulation suitable for data exfiltration;

perform a second inspection method, different from the first inspection method, on the changed software package to generate a second probability indicating a likelihood of the manipulation suitable for data exfiltration;

detect the manipulation suitable for data exfiltration based on at least the first probability exceeding a first probability threshold and the second probability exceeding a second probability threshold; and output a manipulation result based on the detecting and according to a predefined policy indicating a threshold number of inspection methods required to output the manipulation result.

14. The device according to claim 13, wherein the manipulation result is output only when a number of inspection methods performed is greater than or equal to the threshold number of inspection methods required to output the manipulation result.

* * * * *